(12) United States Patent
Kataoka et al.

(10) Patent No.: US 8,107,345 B2
(45) Date of Patent: Jan. 31, 2012

(54) OPTICAL DISK DEVICE AND OPTICAL DISK DISCRIMINATING METHOD

(75) Inventors: Takeyoshi Kataoka, Yokohama (JP); Motoyuki Suzuki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/963,388

(22) Filed: Dec. 8, 2010

(65) Prior Publication Data

US 2011/0075532 A1 Mar. 31, 2011

Related U.S. Application Data

(63) Continuation of application No. 12/325,482, filed on Dec. 1, 2008, now Pat. No. 7,869,321, which is a continuation of application No. 11/295,842, filed on Dec. 6, 2005, now Pat. No. 7,466,639.

(30) Foreign Application Priority Data

Apr. 26, 2005 (JP) .................................. 2005-127309

(51) Int. Cl.
*G11B 7/00* (2006.01)
(52) U.S. Cl. ......... 369/112.02; 369/112.23; 369/112.24; 369/53.2; 369/44.37
(58) Field of Classification Search .......................... None
See application file for complete search history.

(56) References Cited

U.S. PATENT DOCUMENTS

| 6,285,635 B1 | 9/2001 | Watanabe et al. |
| 2005/0270925 A1 | 12/2005 | Yamamoto et al. |

FOREIGN PATENT DOCUMENTS

| JP | 08-287588 | 11/1996 |
| JP | 10-261258 A | 9/1998 |
| JP | 2001-184676 A | 7/2001 |
| JP | 2003-217135 A | 7/2003 |
| JP | 2004-272989 | 9/2004 |
| JP | 2004-311004 | 11/2004 |

OTHER PUBLICATIONS

Japan Patent Office office action for patent application JP2008-308114 (Feb. 1, 2011).

*Primary Examiner* — Muhammad N Edun
(74) *Attorney, Agent, or Firm* — Kilpatrick Townsend & Stockton LLP

(57) ABSTRACT

An optical disk discriminating method and an optical disk device which can detect reflected rays for making discrimination among kinds of optical disks with high accuracies. By switching a plurality of lasers and moving a spherical aberration corrector while moving an objective lens to cause it to approach or keep away from an optical disk, rays reflected light from the optical disk can be detected with high accuracies. Discrimination among the kinds of a plurality of optical disks can be made on the basis of signals generated from the detected reflected rays. This ensures that the kind of an optical disk can be determined through one operation of sweeping.

2 Claims, 17 Drawing Sheets

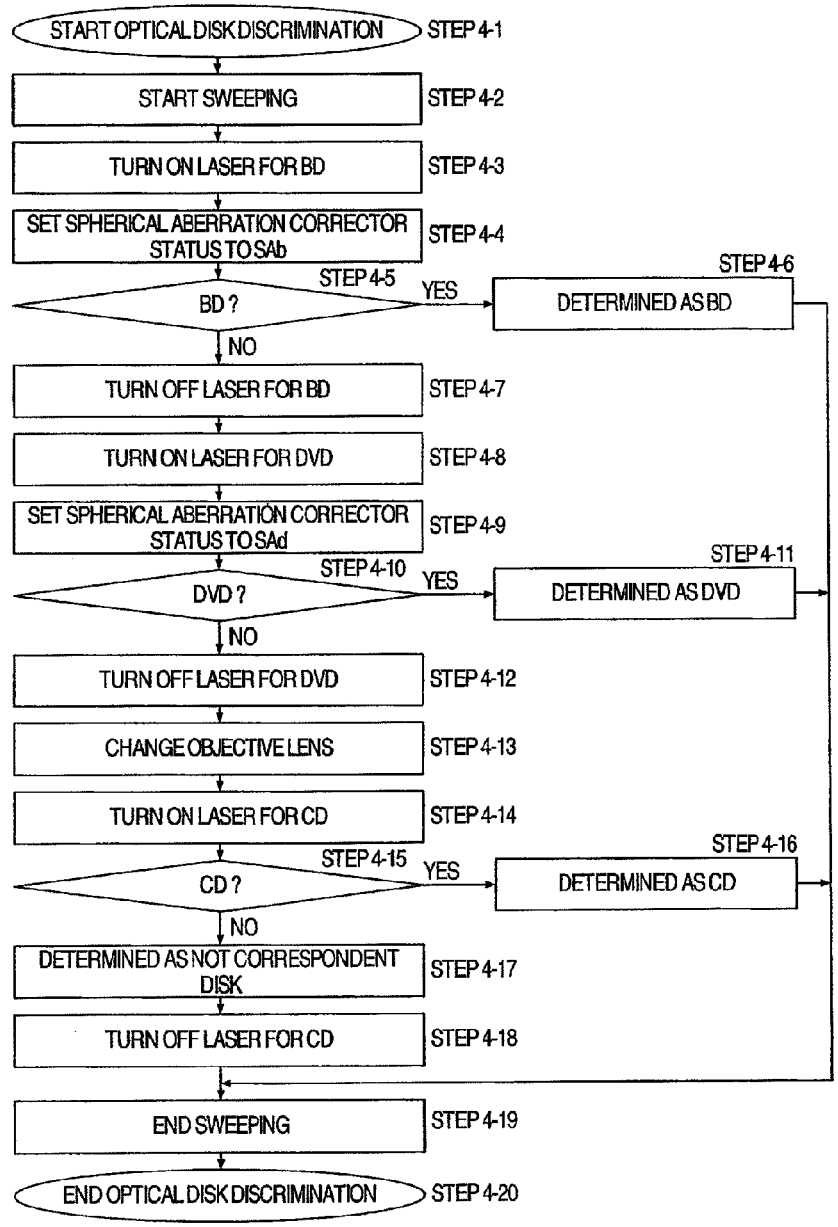

OPTICAL DISK DEVICE AND OPTICAL DISK DISCRIMINATING METHOD

CROSS-REFERENCE TO RELATED APPLICATIONS

This application is a continuation application of U.S. patent application Ser. No. 12/325,482, filed on Dec. 1, 2008, which is a continuation of U.S. patent application Ser. No. 11/295,842, filed on Dec. 6, 2005, which claims priority from Japanese application JP2005-127309 filed on Apr. 26, 2005, the content of which is hereby incorporated by reference into this application.

BACKGROUND OF THE INVENTION

1. Field of the Invention

The present invention relates to an optical disk device and an optical pickup and more particularly, to making discrimination among a plurality of kinds of optical disks.

2. Description of the Related Art

In JP-A-8-287588, the thickness of a cover layer is decided to discriminate the kind of an inserted optical disk by making the focus of a light beam approach the optical disk and measuring a time for the focus to reach an information recording layer from the surface of the optical disk.

An available optical pickup capable of correcting spherical aberration is constructed by having a beam expander disposed in an optical path of flux of light to add a predetermined spherical aberration, having a liquid crystal element for giving a predetermined spherical aberration or having a means for changing the distance between two objective lenses in combination in the direction of focusing to provide spherical aberrations. Presently, a technology has been known which uses an optical pickup constructed as above to intentionally generate a spherical aberration in order to cancel out a spherical aberration caused by an error in cover thickness or an error in spacing between information recording layers.

BRIEF SUMMARY OF THE INVENTION

With the increasing amount of data to be handled, the optical disk has been acceleratedly increasing in its density and kinds. In order for an optical disk device to respond to or comply with a plurality of kinds of optical disks, the optical disk device needs to discriminate the kind of an inserted optical disk.

The thickness of a cover layer extending from the surface of an optical disk to an information recording layer, the corresponding laser wavelength and the track pitch differ with kinds of optical disks and therefore, discrimination among the kinds is made on the basis of features of individual disks.

Recently, an increasing number of different kinds of semiconductor lasers are becoming available and, other than CD and DVD, standardization of Blu-ray Disc (hereinafter referred to as BD) and HD-DVD having ability to perform recording of higher density has at present been in progress.

In the BD, laser wavelength λ is shortened and NA (numerical aperture) of an objective lens of an optical pickup corresponding to or complying with the BD is widened and as a consequence, the aberration affects greatly. Especially, a spherical aberration SA is given by expression (1) where $\Delta T$ represents an error in thickness of the cover layer (hereinafter termed a cover thickness error) and λ represents a wavelength of flux of light:

$$SA \infty \frac{\Delta T \cdot NA^4}{\lambda} \quad (1)$$

Expression (1) indicates that the spherical aberration increases in direct proportion to a biquadrate of NA of the objective lens and error $\Delta T$ in thickness of the disk substrate and in inverse proportion to the laser wavelength λ.

In JP-A-8-287588 as above, one laser is activated for illumination to make discrimination. But, if a plurality of kinds of optical disks are irradiated using the one laser, desired characteristics of a reflected ray cannot be obtained in the presence of an optical disk unsuitable for a laser wavelength of the laser.

In addition, even if a laser beam suitable to an optical disk inserted in the optical disk device is irradiated, a light spot increases in size unless the spherical aberration is corrected properly, so that a desired reflected ray cannot be obtained.

Specifically, in an optical disk constructed to have an information recording layer structure in the form of two or more layers, a spherical aberration attributable to an error in spacing between the information recording layers takes place similarly to an error due to the cover thickness. Therefore, in the optical disk of multi-layer structure, the spherical aberration attributable to the error in the spacing between its recording layers must be corrected.

In the case of the optical disk of multi-layer structure, it is necessary to detect how many information recording layers the focus transmits through but in case the irradiation is done with an unsuited laser wavelength or the spherical aberration is not corrected, the optical disk can hardly be decided as to whether to be of a multi-layer structure.

Further, even if a semiconductor laser for DVD or CD is activated for emission while making a spherical aberration corrector comply with a BD, a light spot cannot be focused successfully on the information recording surface of the DVD or CD. For this reason, the spherical aberration corrector must be adjusted in accordance with the kind of a semiconductor laser to be activated.

An object of the present invention is to detect reflected rays with high accuracies to make discrimination among media irrespective of kinds of optical disks by sequentially illuminating a plurality of lasers of different wavelengths so as to change or switch the lasers for illumination and by making a suitable spherical aberration correction by means of the spherical aberration corrector, while moving an objective lens for focusing a laser beam on the optical disk in the direction of focusing.

According to the present invention, even for an optical disk of multi-layer structure and optical disks causing different amounts of spherical aberration, discrimination among the disks can be made with high accuracies.

Other objects, features and advantages of the invention will become apparent from the following description of the embodiments of the invention taken in conjunction with the accompanying drawings.

BRIEF DESCRIPTION OF THE DRAWINGS

FIG. 17 is a flowchart in the fourth embodiment of the invention.

DETAILED DESCRIPTION OF THE INVENTION

Embodiments of this invention will now be described with reference to the accompanying drawings. An optical disk device of the invention can be of any type including a device dedicated to reproduction, a device dedicated to recording or a recording/reproduction device, on condition that it can make discrimination among optical disks. As far as the present invention is concerned, the reproduction only device and recording only device differ from each other in that either reproduction or recording is carried out after discrimination among optical disks has been made. On the other hand, the recording/reproduction device can perform recording or reproduction after discrimination among optical disks.

Figure 1:
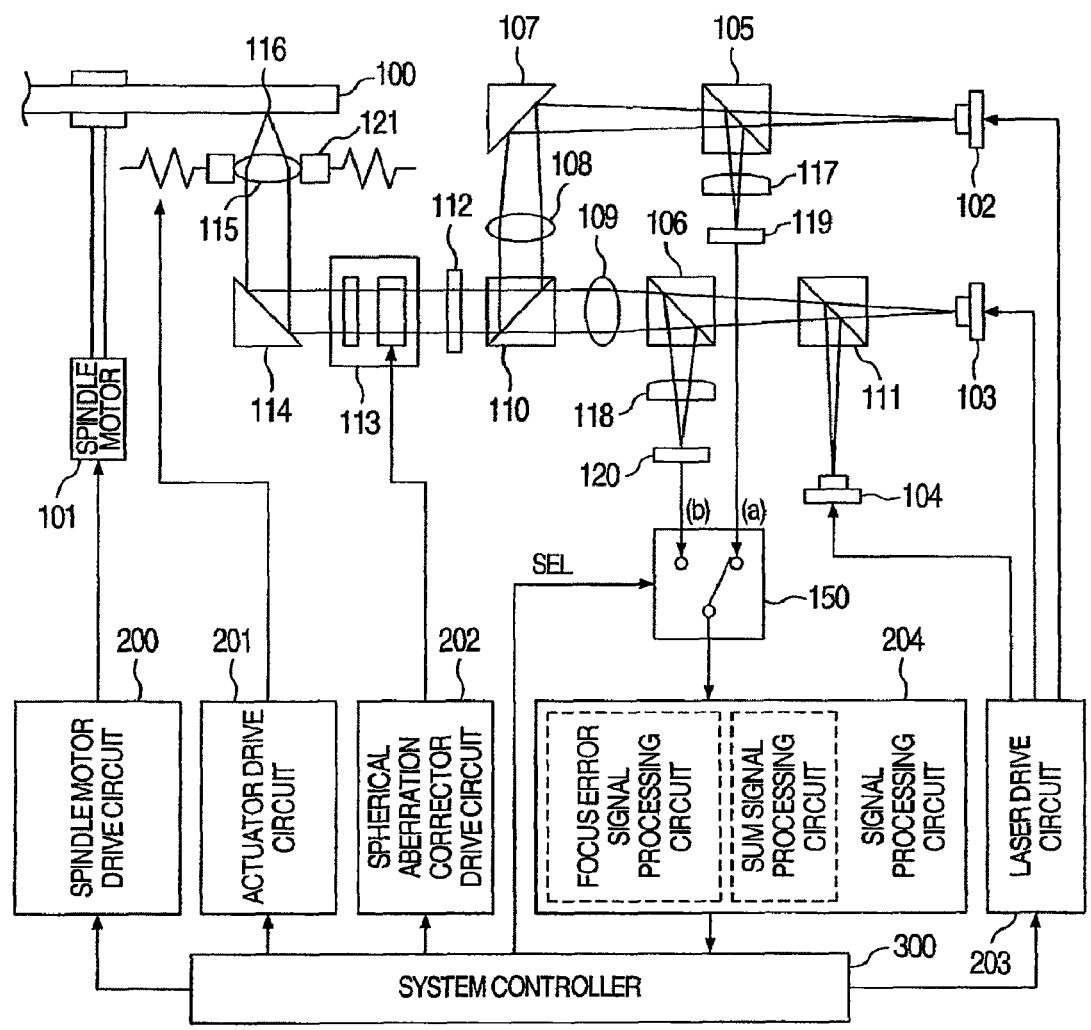
FIG. 1 is a block diagram showing an optical disk device according to a first embodiment of the present invention.

Referring first to FIG. 1, an optical disk device and optical pickup according to the present invention is constructed as illustrated therein in block form.

An optical disk 100 rotatable by means of a spindle motor 101 undergoes information read, erase or write under irradiation of a laser beam.

A semiconductor laser 102 emits a laser beam for BD. Flux of light of the laser beam is passed through a beam splitter 105, reflected by a mirror 107, shaped into parallel light flux by means of a collimate lens 108, reflected by a dichroic mirror 110, passed through a quarter-wave plate 112, passed through a spherical aberration corrector 113, reflected by a mirror 114 and caused by an objective lens 115 to be formed into a light spot 116 on an information recording layer of optical disk 100. A reflected ray from the optical disk 100 travels a route similar to the going route so as to be reflected by the beam splitter 105, passed through a cylindrical lens 117 and detected by a photodetector 119.

A semiconductor laser 103 emits a laser beam for DVD. Flux of light of the laser beam is passed through a dichroic mirror 111, passed through a beam splitter 106, shaped into parallel light flux by means of a collimate lens 109, passed through the dichroic mirror 110, passed through the quarter-wave plate 112, passed through the spherical aberration corrector 113, reflected by the mirror 114 and formed by the objective lens 115 into a light spot 116 on the information recording layer of optical disk 100. A reflected ray from the optical disk 100 travels a route similar to the going route so as to be reflected by the beam splitter 106, passed through a cylindrical lens 118 and detected by a photodetector 120.

A semiconductor laser 104 emits a laser beam for CD. Flux of light of the laser beam is reflected by the dichroic mirror 111, passed through the beam splitter 106, shaped into parallel light flux by the collimate lens 109, passed through the dichroic mirror 110, passed through the quarter-wave plate 112, shaped into a divergent beam by means of the spherical aberration corrector 113, reflected by the mirror 114 and formed by the objective lens 115 into a light spot 116 on the information recording layer of optical disk 100. A reflected ray from the optical disk 100 travels a route similar to the going route so as to be reflected by the beam splitter 106, passed through the cylindrical lens 118 and detected by the photodetector 120.

The spherical aberration corrector 113 is an optical element for correcting a spherical aberration attributable to an error in the thickness of cover layer and is comprised of, for example, a so-called beam expander in which two lenses of variable inter-lens distance are used in combination and the inter-lens distance is changed and adjusted by a drive signal from a spherical aberration corrector drive circuit 202 so that the spherical aberration of passing light flux may be corrected. The spherical aberration corrector is not limited to this type but for example, it may be a liquid crystal element which has a concentric pattern to provide a phase difference between inner and outer circumferential portions of flux of light, thereby attaining the above effect. In any case, the corrector is adapted to correct spherical aberrations in compliance with the respective laser beams from the plurality of semiconductor lasers. It is now assumed that the spherical aberration corrector is conditioned to exhibit status SAb suitable for BD, status SAd suitable for DVD and status SAc suitable for CD. Values suited to the status are set pursuant to, for example, standards of BD, DVD and CD and stored in advance in a memory of the optical disk device. Products of optical disk device are uneven and therefore the values may preferably be set differently product by product.

The objective lens 15 is a triple-wave correspondent lens which is controlled by an actuator 121 in tracking direction and focusing direction so as to be changed in its NA in accordance with a laser wavelength for BD, a laser wavelength for DVD and a laser wavelength for CD. As the objective lens, a multi-focus objective lens is used which changes in focal point in accordance with laser beams of a plurality of wavelengths.

The dichroic mirror is an element for reflecting or transmitting laser beams in accordance with differences in laser wavelength and especially, the dichroic mirror 110 is an element for reflecting the laser wavelength for BD and transmitting the laser wavelengths for DVD and CD and the dichonic mirror 111 is an element for transmitting the laser wavelength for DVD and reflecting the laser wavelength for CD.

The photodetector 119 outputs a signal corresponding to a reflected ray of the laser beam for BD from the optical disk and the output signal connects to an input terminal (a) of a change-over switch 150.

The photodetector 120 outputs signals corresponding to reflected rays of the laser beams for DVD and CD from the disk and the output signals connect to an input terminal (b) of the change-over switch 150.

A spindle motor drive circuit 200 is a circuit controlled by a system controller 300 to drive the spindle motor 101, an actuator drive circuit 201 is a circuit controlled by the system controller 300 to drive the actuator 121, the spherical aberration corrector drive circuit 202 is a circuit controlled by the system controller 300 to drive the spherical aberration corrector 113, and a laser drive circuit 203 is a circuit controlled by the system controller 300 to activate the semiconductor lasers 102 to 104 for emission.

The change-over switch 150 responds to a transfer signal SEL delivered out of the system controller 300 to selectively output the input signals and its output signals connect to a signal processing circuit 204.

Figure 2:
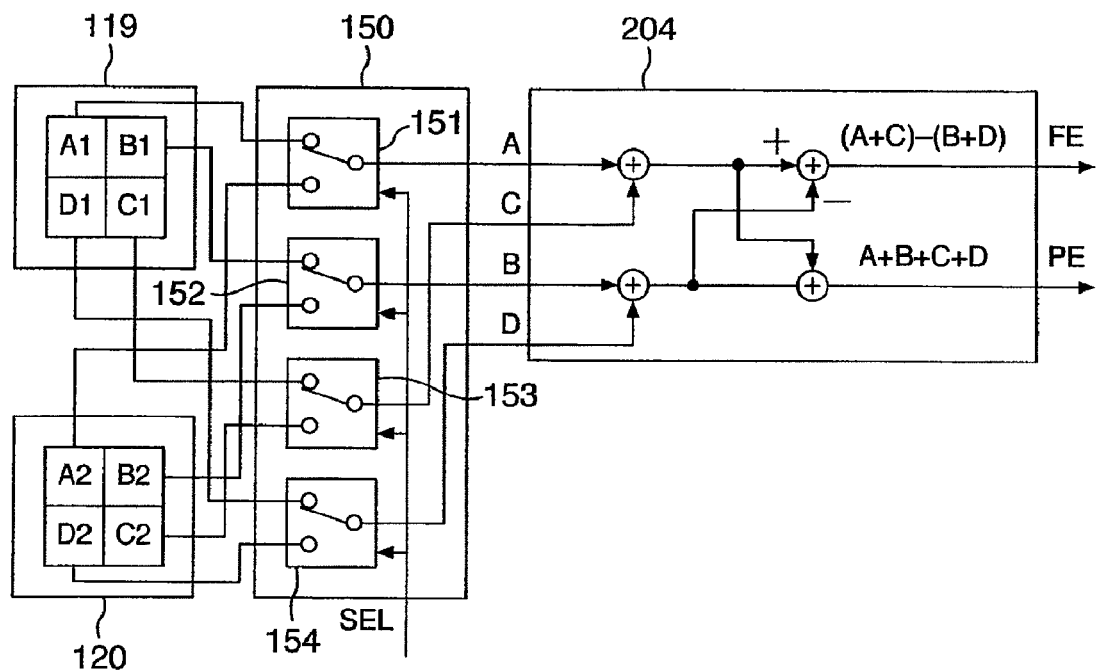
FIG. 2 is a diagram showing connection from photodetectors to a signal processing circuit in the first embodiment of the invention.

Turning to FIG. 2, the photodetector 119, photodetector 120, change-over switch 150 and signal processing circuit 204 are connected to one another as illustrated therein. The photodetector (four-element photodetector) 119 is comprised of quarter photo-detectors A1, B1, C1 and D1. Likewise, the photodetector (four-element photodetector) 120 is comprised of quarter photo-detectors A2, B2, C2 and D2. Outputs of the quarter photo-detectors A1 and A2 are connected to a transfer switch 151 and outputs of the quarter photo-detectors B1 and B2 are connected to a transfer switch 152. Outputs of the quarter photo-detectors C1 and C2 are connected to a transfer switch 153 and outputs of the quarter photo-detectors D1 and D2 are connected to a transfer switch 154.

In the transfer switches 151 to 154, the photo-detectors A1, B1, C1 and D1 are connected to provide signals A, B, C and D, respectively, when the transfer signal SEL is 1 and photo-detectors A2, B2, C2 and D2 are connected to provide signals A, B, C and D, respectively, when the transfer signal SEL is 2. In other words, the change-over switch 150 responds to the SEL signal to perform switching between the output of the photodetector 119 for detection of reflected light from a BD and the output of the photodetector 120 for detection of reflected light from a DVD or CD, thus selectively supplying the outputs to the signal processing circuit 204. As described above, the number of output signals from each of the photo-detectors 119 and 120 is four and the number of output signals from the change-over switch is also four but in FIG. 1, for simplification of illustration, the respective output signals are put together and indicated by one. The system controller 300 outputs the SEL signal such that the photodetector 119 can be connected to the signal processing circuit 204 when the semi-conductor laser 102 is activated but it outputs the SEL signal such that the photodetector 120 can be connected to the signal processing circuit 204 when the semiconductor laser 103 or 104 is activated.

In FIG. 2, the signal processing circuit 204 includes adders and subtracters. Here, all of the signals A, B, C and D are added together to provide (A+B+C+D) which is a sum signal PE of reflection signals from the optical disk 100 (hereinafter referred to as PE signal). Also, (A+C)−(B+D) provides a focus error signal based on the known astigmatism method (hereinafter referred to as FE signal).

By using the PE signal and FE signal, the system controller 300 discriminates the kind of the optical disk 100 pursuant to a method to be described later.

Figure 3:
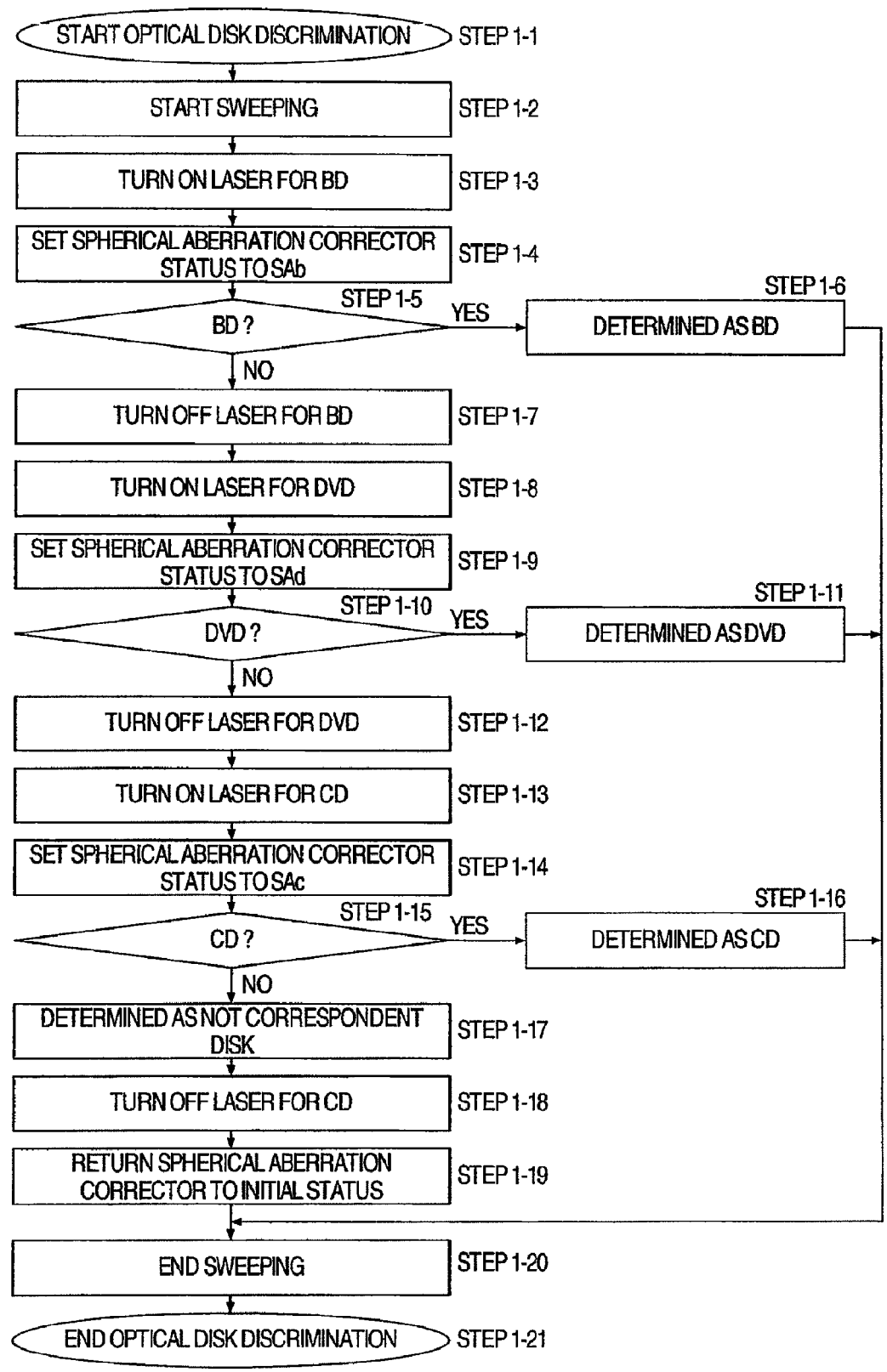
FIG. 3 is a flowchart in the first embodiment of the invention.

Illustrated in FIG. 3 is a flowchart of a discriminating method in the present embodiment. In step 1-1, discrimination is started. In step 1-2, sweeping is started. "Sweeping" referred to herein signifies that the actuator drive circuit 201 responds to a signal from the system controller 300 to move the actuator 121 so that the objective lens 115 may be moved in the direction of focusing. Assumptivley, in the following description, sweeping for causing the objective lens 115 to approach the optical disk 100 is called up-sweep and conversely, to depart or keep away from the optical disk 100 is called down-sweep. In step 1-2, down-sweep is first carried out to separate the objective lens 115 from the optical disk 100 to a remote movable end and thereafter up-sweep is executed.

In step 103, the semiconductor laser 102 for BD is turned on to emit a laser beam for BD. In step 1-4, the spherical aberration corrector 113 is moved so as to be brought into the status SAb. In step 1-5, it is decided whether the disk is a BD or not. If YES in the step 1-5, the program proceeds to step 1-6 in which the optical disk 100 is determined as a BD. If No in the step 1-5, the program proceeds to step 1-7 in which the semiconductor laser 102 for BD is turned off.

In step 1-8, the semiconductor laser 103 for DVD is turned on to emit a laser beam for DVD. In step 1-9, the spherical aberration corrector 113 is moved so as to be brought into the SAd status. In step 1-10, it is decided whether the disk is a DVD. If YES in the step 1-10, the program proceeds to step 1-11 in which the optical disk 100 is determined as a DVD. If No in the step 1-10, the program proceeds to step 1-12 in which the semiconductor laser 103 for DVD is turned off.

In step 1-13, the semiconductor laser 104 is turned on to emit a laser beam for CD. In step 1-14, the spherical aberration corrector 113 is moved so as be brought into the SAc status. In step 1-15, it is decided whether the disk is a CD. If YES in the step 1-15, the program proceeds to step 1-16 in which the optical disk 100 is determined as a CD. If No in the step 1-15, the program proceeds to step 1-17 in which the optical disk is determined as an optical disk the optical disk device cannot comply with or no insertion of optical disk into the optical disk device is determined and in step 1-18, the semiconductor laser 104 for CD is turned off. In step 1-19, the status of spherical aberration corrector 113 is returned to the initial status.

The step 1-6, 1-11, 1-16 or 1-19 is followed by step 1-20 in which sweeping is ended and the discrimination process ends in step 1-21.

After completion of the discrimination process, the laser and the spherical aberration corrector are placed in condition suitable for the optical disk 100 and therefore, focus pull-in can be done with high accuracy.

A detailed description will be given of the flowchart of FIG. 3 hereunder. A method for discriminating the disk as to whether to be a BD, a method for discriminating the disk as to whether to be a DVD and a method for discriminating the disk as to whether to be a CD will be detailed with reference to FIGS. 4 and 5, FIGS. 6 and 7 and FIG. 8, respectively.

Figure 4:
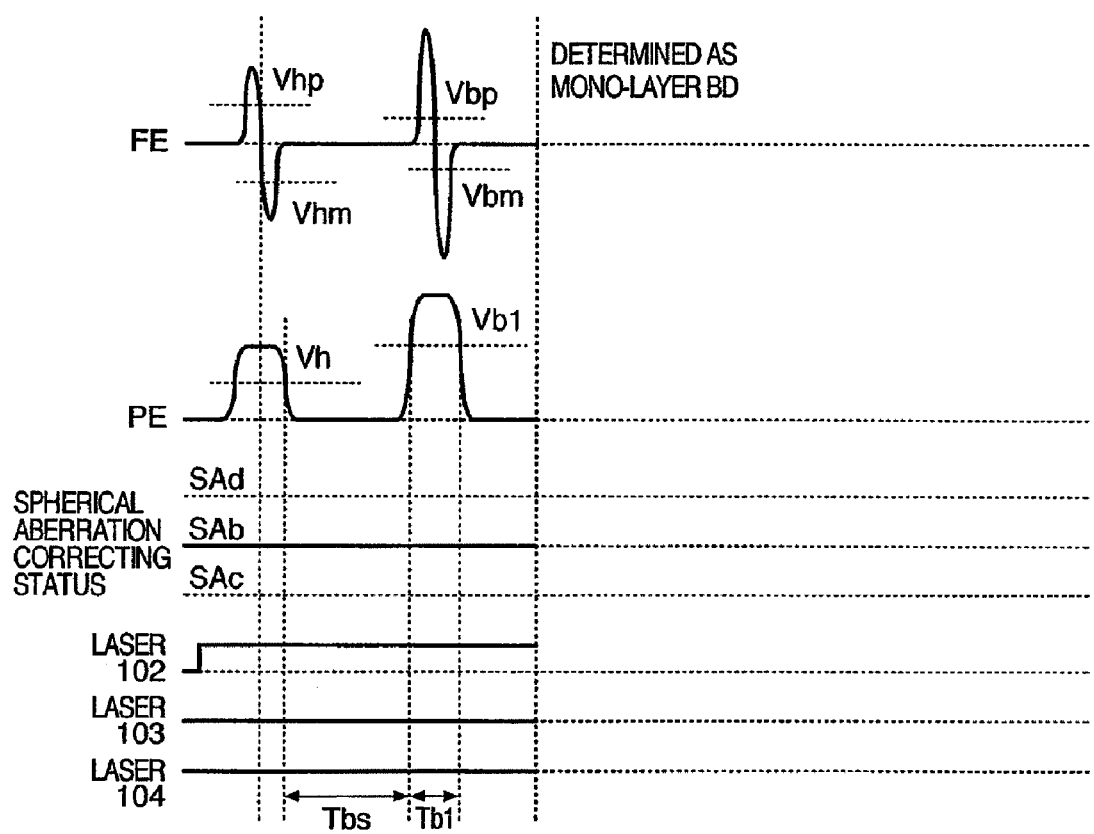
FIGS. 4 to 8 are time charts showing signal waveforms in the first embodiment of the invention.

Referring to FIG. 4, there is illustrated a time chart useful to explain a discriminating method when the optical disk 100 is a BD of one layer. While sweeping has already been started, the semiconductor laser 102 for BD is activated to emit a laser beam (laser 102 in FIG. 4 is in Hi condition) and the spherical aberration corrector is in the SAb status. FE and PE signals are used to decide whether the focus of the laser beam reaches the surface of optical disk 100. When the voltage level of FE signal crosses Vhp and Vhm and the voltage level of PE signal crosses Vh, reaching the surface is determined. As the voltage level of PE signal falls below Vh, time is measured. Then, if, after the lapse of approximate time Tbs (for example, an error of ±10%), the FE signal sequentially crosses Vbp and Vbm and the voltage level of PE signal crosses Vb1 for a time of about Tb1, the optical disk 100 is determined as a mono-layer BD.

Figure 5:
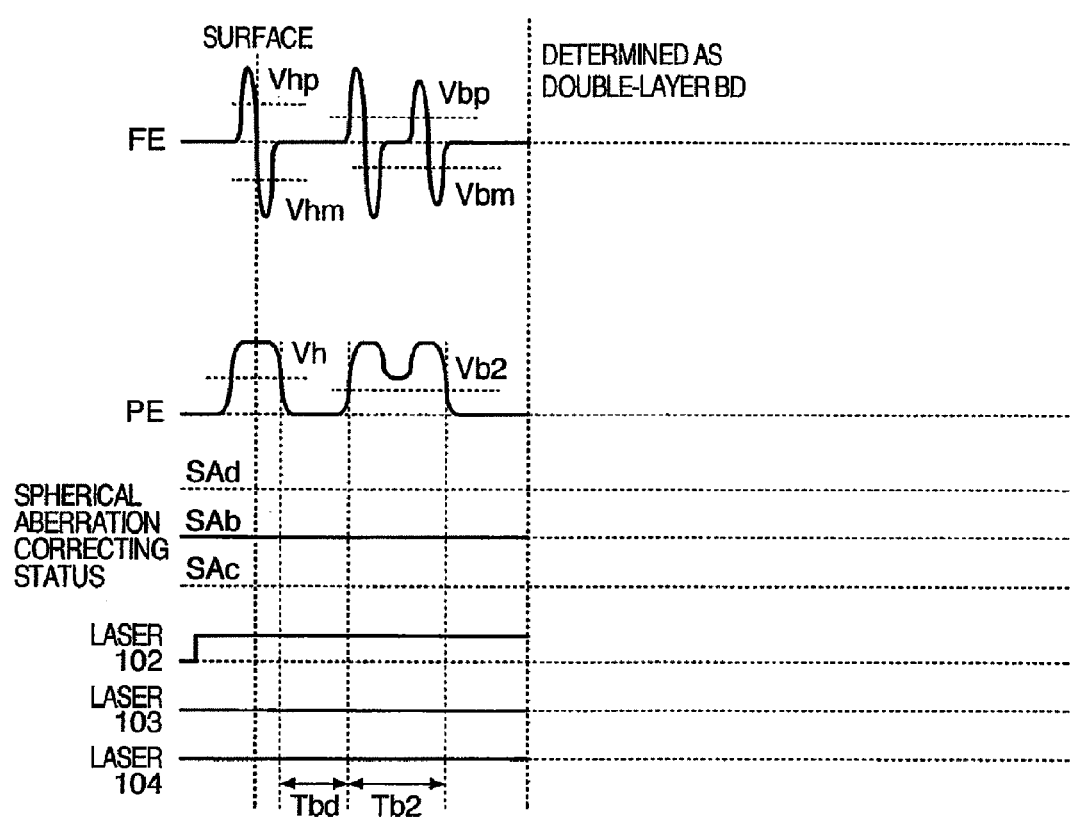

Turning to FIG. 5, there is illustrated a time chart useful to explain a discriminating method when the optical disk 100 is a double-layer BD. Reaching the surface is determined in a similar way to FIG. 4 and time is measured at the time that the voltage level of PE signal falls below Vh. Then, if after the lapse of approximate time Tbd, the voltage level of FE signal crosses twice Vbp during rise and Vbm during fall reiteratively and besides the voltage level of PE signal crosses Vb2 for a time of about Tb2, the optical disk 100 is determined as a double-layer BD.

Figure 6:
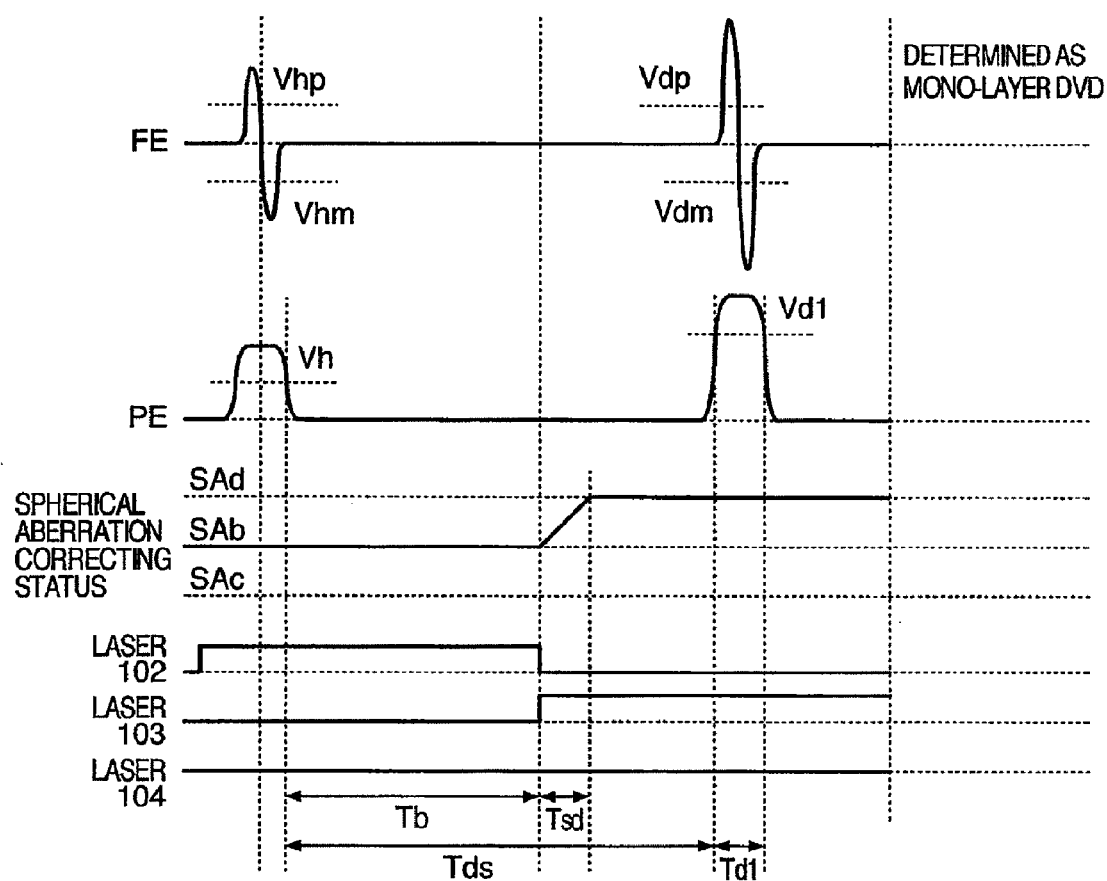

Turning to FIG. 6, there is illustrated a time chart useful to explain a discriminating method when the optical disk 100 is a mono-layer DVD. In case the discrimination condition for BD is not satisfied by the FE and PE signals within time Tb after arrival at the surface is determined as in the case of FIG. 4, the optical disk 100 is determined as not being a BD and the semiconductor laser 102 for BD is turned off (laser 102 in FIG. 6 is in Low condition) and the semiconductor laser 103 for DVD is activated for emission (laser 103 in FIG. 6 is in Hi condition). Further, the status of spherical aberration corrector is shifted from SAb to SAd suited for DVD. Then, if, at the termination of a time of about Tds after the voltage level of PE signal has fallen below Vh, the FE signal sequentially crosses Vdp and Vdm and besides the voltage level of PE signal crosses Vd1 for a time of about Td1, the optical disk 100 is determined as a mono-layer DVD.

Figure 7:
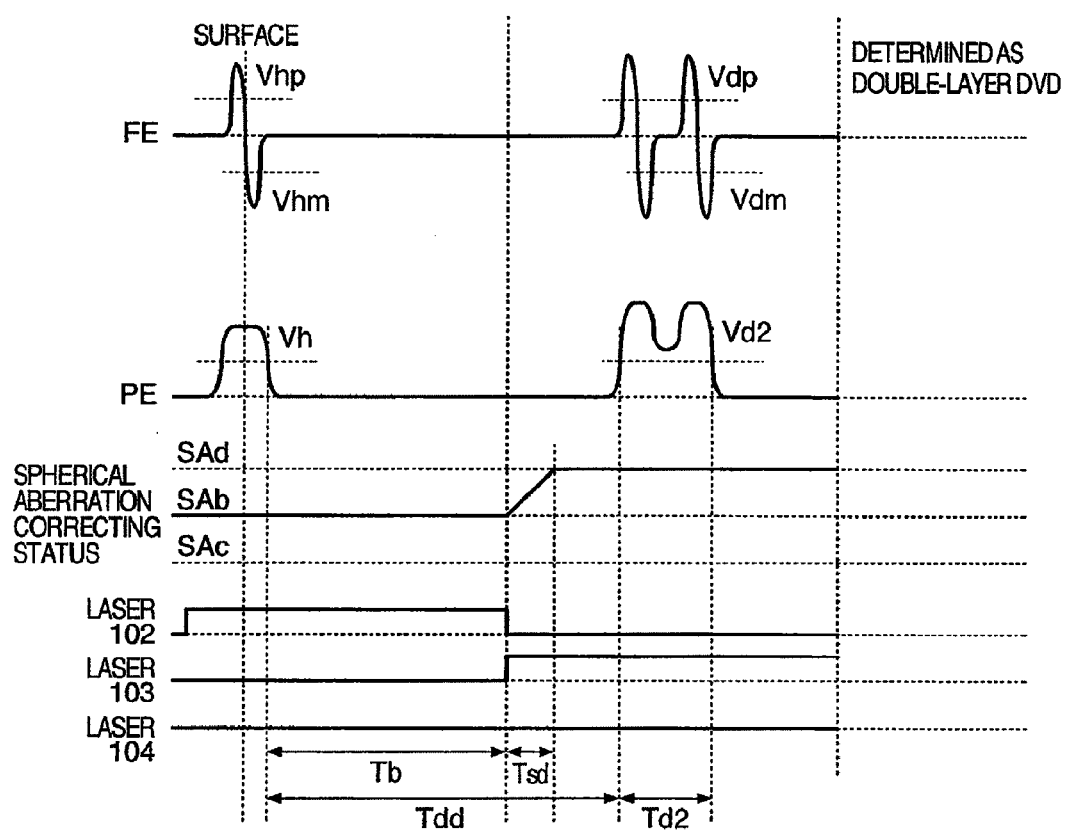

Turning to FIG. 7, there is illustrated a time chart for explaining a discriminating method when the optical disk 100 is a double-layer DVD. As in the case of FIG. 6, the semiconductor laser 102 for BD is turned off, the semiconductor laser 103 for DVD is activated and the status of spherical aberration corrector is shifted from SAb to SAd suited for DVD. Time is measured as the voltage level of PE signal falls below Vh. Then, if, at the termination of a time of about Tdd, the voltage level of FE signal crosses twice Vdp during rise and Vdm during fall reiteratively and besides the voltage level of PE signal crosses Vd2 for a time of about Td2, the optical disk 100 is determined as a double-layer DVD.

Figure 8:
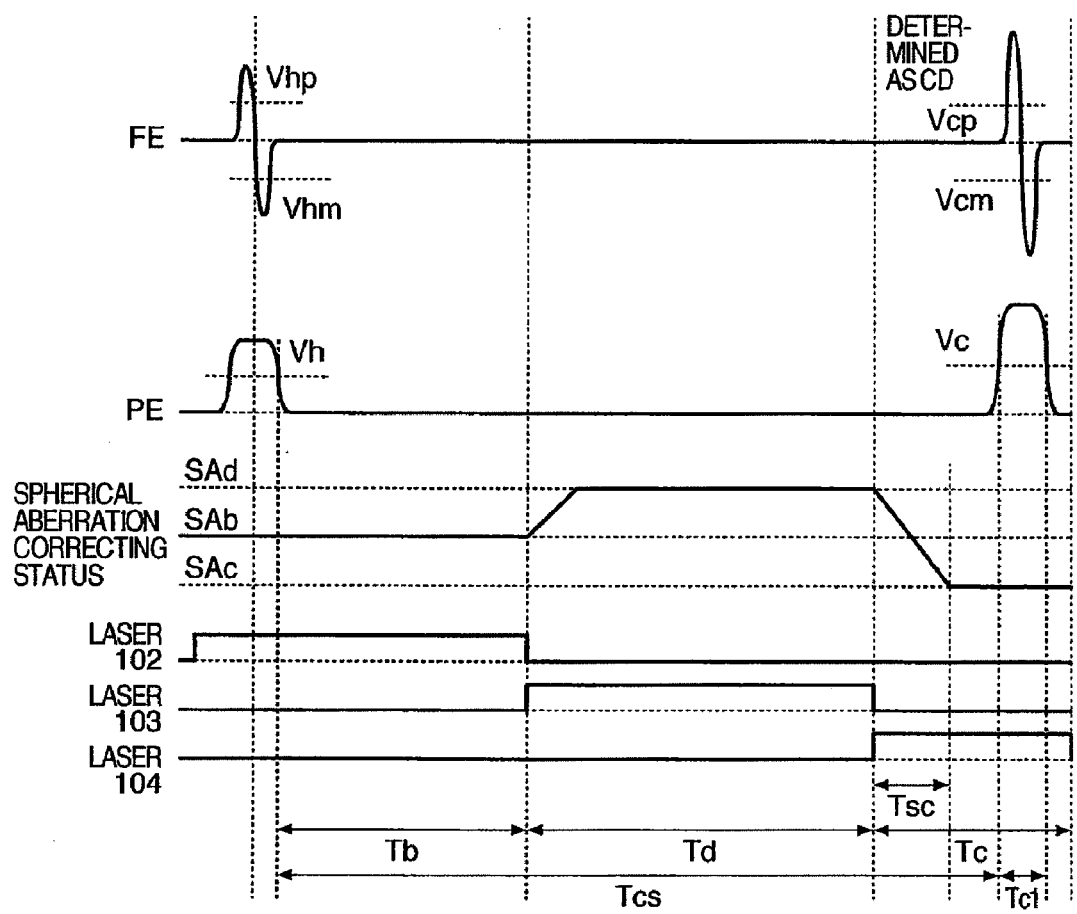

Turning to FIG. 8, there is illustrated a time chart for explaining a discriminating method when the optical disk 100 is a mono-layer CD. As in the case of FIG. 6, reaching the surface is determined, the optical disk 100 is determined as not being a BD, the semiconductor laser 102 for BD is turned off and the semiconductor laser 103 for DVD is activated. Thereafter, if the discrimination condition for DVD is not satisfied by the FE and PE signals within a time of Td, the optical disk 100 is determined as not being a DVD, so that the semiconductor laser 103 for DVD is turned off (laser 103 in FIG. 8 in Low condition) and the semiconductor laser 104 for CD is activated (laser 104 in FIG. 8 is in Hi condition). Further, the status of spherical aberration corrector is shifted from SAd to SAc suited for CD. If, at the termination of a time of about Tcs after the voltage level of PE signal has fallen below Vh, the FE signal sequentially crosses Vcp and Vcm and besides the voltage level of PE signal crosses Vc for a time of about Tel, the optical disk 100 is determined as a CD. Contrarily, if the discrimination condition for CD is not satisfied by the FE and PE signals during a time Tc following activation of the semiconductor laser 104 for CD, it is determined that no disk is inserted in the optical disk device and the semiconductor laser 104 for CD is turned off.

Now, the speed of sweeping will be described. In connection with FIGS. 6 and 7, the sum of time Tsd required for moving the spherical aberration corrector from the status SAb to the status SAd suitable for DVD and time Tb needs to be far smaller than time Tds or time Tdd and in connection with FIG. 8, the total of time Tsc required for moving the spherical aberration corrector from the status SAd to the status SAc suited for CD, time Tb and time Td needs to be far smaller than time Tcs. The above conditions can be expressed by conditional expression (2):

$$Tds > Tsd + Tb$$

$$Tdd > Tsd + Tb$$

$$Tcs > Tsc + Tb + Td \quad (2)$$

It is now assumed that the sweeping speed is constant amounting to Vsw, a cover layer extending from the surface of a BD to its information recording film is Db in thickness, a cover layer extending from the surface of a DVD to its information recording layer is Dd in thickness and a cover layer extending form the surface of a CD to its information recording layer is Dc in thickness. Then, conditions expressed by expression (3) must be satisfied between the Vsw and the Tb, Td and Tc.

$$Tb > \frac{Db}{Vsw} \quad (3)$$

$$Tb + Td > \frac{Dd}{Vsw}$$

$$Tb + Td\ Tc > \frac{Dc}{Vsw}$$

A sweeping speed Vsw satisfying the above six conditional formulas is set and then the Tb, Td and Tc are set on the basis of the set sweeping speed. In addition, the sensitivity of the actuator is uneven and the thickness of the cover layer is also uneven and therefore, the unevenness is also taken into consideration for setting.

As described as above, in embodiment 1 of the invention, activation of the semiconductor lasers is switched with time in order of BD, DVD and CD to make discrimination among the media. Conditions for discrimination represented by time, voltage level and time for switching lasers are stored in advance in a memory medium such as a memory of the optical disk device. In the present embodiment, execution of switching semiconductor lasers and discrimination among media are referenced to the lapse of time following detection of the surface but in the case of an optical pickup having an objective lens whose position in the direction of focusing can be measured, a method may also be employed according to which the laser switching and the determination among media are carried out without depending on the lapse of time but on the basis of a distance over which the objective lens moves in the focusing direction after completion of detection of the surface. It will be appreciated that in the present method, the distance between the surface of optical disk 100 and the objective lens 115 at the time that the focus of the laser beam is irradiated on the information recording layer of optical disk 100 must differ depending on the kind of the optical disk.

The above-described method is applicable to the case where the optical pickup has such a characteristic that the position of objective lens 115, taken up when the laser beam is focused on the information recording layer of optical disk 100, approaches the optical disk 100 in order of BD, DVD and CD. If the optical pickup has such a characteristic that the position of objective lens 115, taken up when the laser beam is focused on the information recording layer of optical disk 100, approaches the optical disk 100 in order of BD, CD and DVD, the semiconductor lasers for BD, CD and DVD are activated in this order following start of up-sweep and the spherical aberration corrector is also moved in order of the status suited for BD, status suited for CD and status suited for DVD. This can ensure that the kind of optical disk 100 can be determined through one sweeping operation.

Embodiment 2

Figure 9:
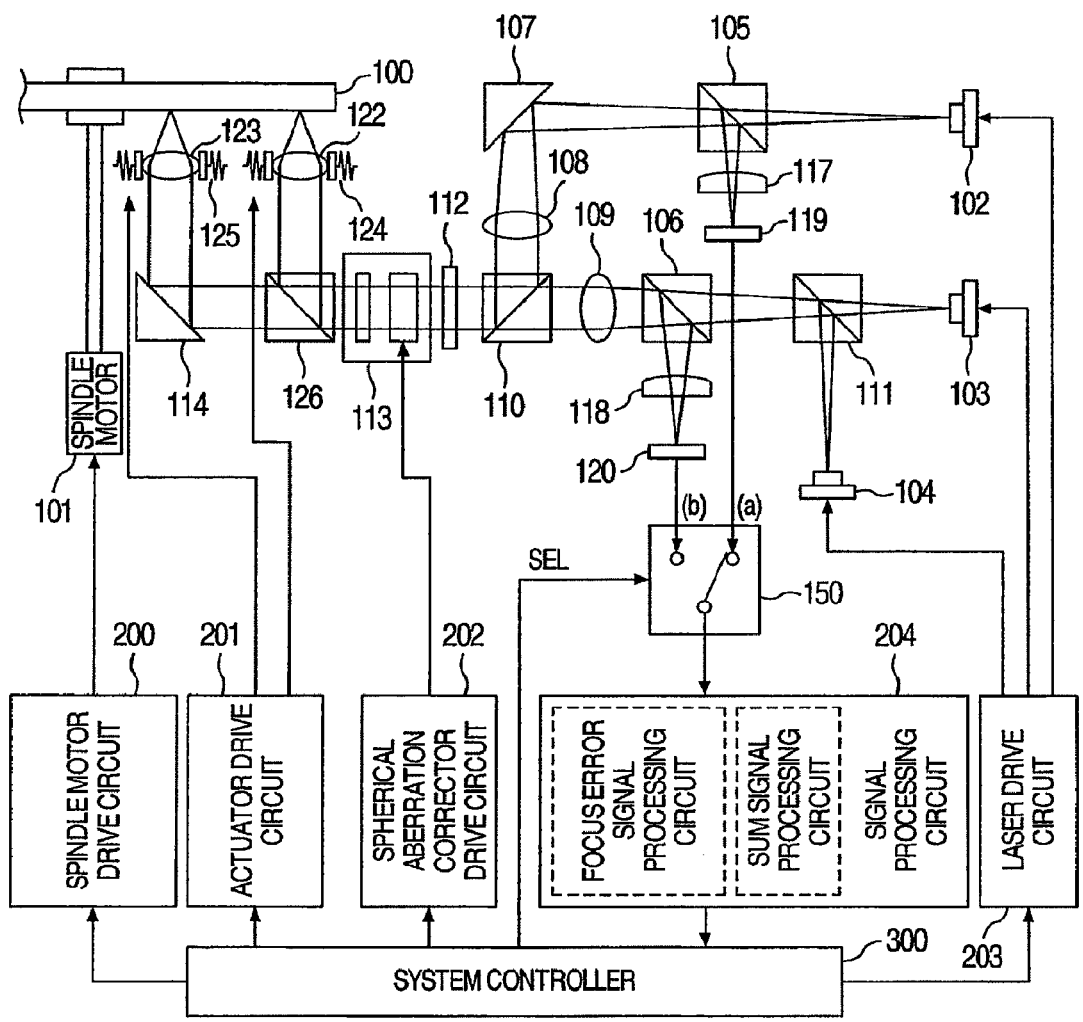
FIG. 9 is a block diagram showing an optical disk device according to a second embodiment of the present invention.

Referring now to FIG. 9, a second embodiment of the present invention will be described. Components in FIG. 9 designated by the same reference numerals as those in FIG. 1 are identical to the constituents explained in connection with embodiment 1.

An optical disk device of FIG. 9 does not comprise the objective lens 115 correspondent to three wavelengths of BD, DVD and CD in FIG. 1 but is comprised of an objective lens 122 for focusing a laser beam for BD and an objective lens 123 correspondent to two wavelengths of DVD and CD. A laser beam for BD is focused by means of the objective lens 122 for BD and laser beams for DVD and CD are focused by means of the objective lens 123 for DVD/CD. The objective lens 122 is moved by an actuator 124 and the objective lend 123 is moved by an actuator 125.

A dichroic mirror 126 reflects a laser beam for BD so as to lead the laser beam for BD to the objective lens 122 but transmits the laser beams for DVD and CD. The laser beams for DVD and CD having transmitted through the dichroic mirror 126 are reflected by the mirror 114 so as to be led to the objective lens 123.

Figure 10:
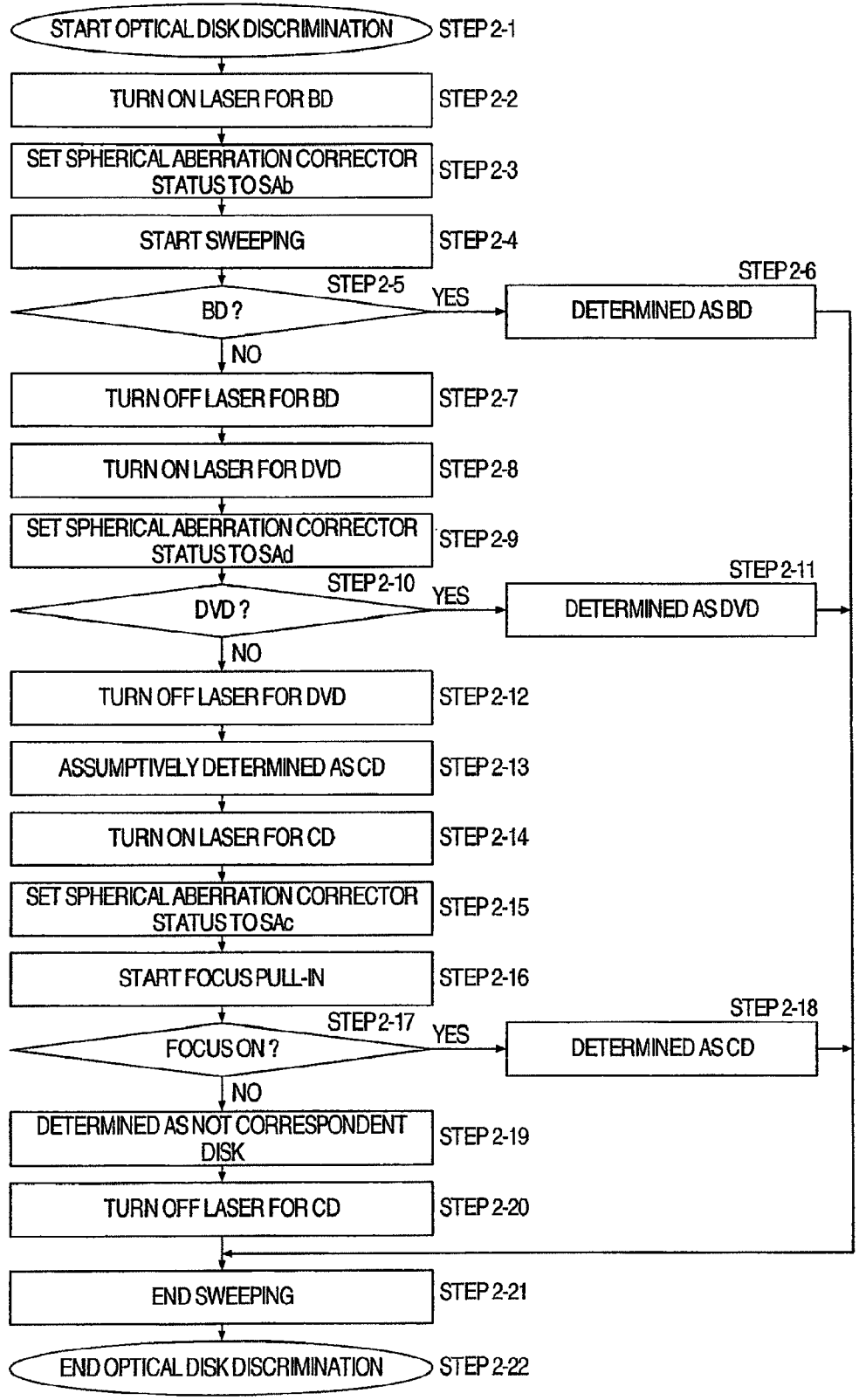
FIG. 10 is a flowchart in the second embodiment of the invention.

Illustrated in FIG. 10 is a flowchart of a discriminating method in the present embodiment. In step 2-1, optical disk discrimination is started. In step 2-2, the semiconductor laser 102 for BD is activated. In step 2-3, the status of spherical aberration corrector 113 is shifted to SAb suited for BD. In step 204, the objective lens 122 is kept away from the optical disk 100 to a remote movable end and thereafter, it undergoes up-sweep. In step 2-5, it is decided whether the disk is a BD. The discrimination conditions used herein are identical to those in the method described in embodiment 1 with reference to FIGS. 4 and 5 in which the surface and the recording surface are detected in accordance with signal levels and discrimination is made on the basis of time required for sweeping from the surface to the recoding surface, with the exception that laser switching is not executed with time and the objective lens 122 is swept up to a movable end close to the optical disk 100. If YES in the step 2-5, the program proceeds to step 2-6 in which the disk is determined as a BD. If No in the step 2-5, the program proceeds to step 2-7 in which the disk is determined as not being a BD and the BD laser is turned off.

In step 2-8, the semiconductor laser 103 for DVD is activated. In step 2-9, the status of spherical aberration corrector 113 is brought into SAd suited for DVD. In step 2-10, it is decided whether the disk is a DVD. Discrimination conditions used herein are identical to those used in the method explained in embodiment 1 with reference to FIGS. 6 and 7 in which the surface and the recording surface are detected in accordance with signal levels and discrimination is made on the basis of time required for sweeping from the surface to the recording surface, with the exception that laser switching is not executed with time and the objective lens 123 is swept up to a movable end close to the optical disk 100. If YES in the step 2-10, the program proceeds to step 2-11 in which the disk is determined as a DVD. If No in the step 2-10, the program proceeds to step 2-12 in which the disk is determined as not being a DVD and the laser for DVD is turned off.

In step 2-13, the optical disk 100 is presumptively determined as a CD. In step 2-14, the semiconductor laser 104 for CD is activated. In step 2-15, the status of spherical aberration corrector 113 is brought into SAc suited for CD. In step 2-16, the objective lens 123 is separated from the optical disk 100 to a remote movable end and subsequently up-sweep is carried out to start focus pull-in. In step 2-17, it is decided whether a focus servo can be turned on. If YES in the step 2-17, the program proceeds to step 2-18 in which the disk is determined as a CD. If No in the step 2-17, the program proceeds to step 2-19 in which the disk is determined as not being a correspondent disk and in step 2-20, the laser for CD is turned off.

After completion of the step 2-6, 2-12, 2-18 or step 2-20, sweeping is ended in step 2-21 and the process for making discrimination among optical disks is ended in step 2-22.

Figure 11:
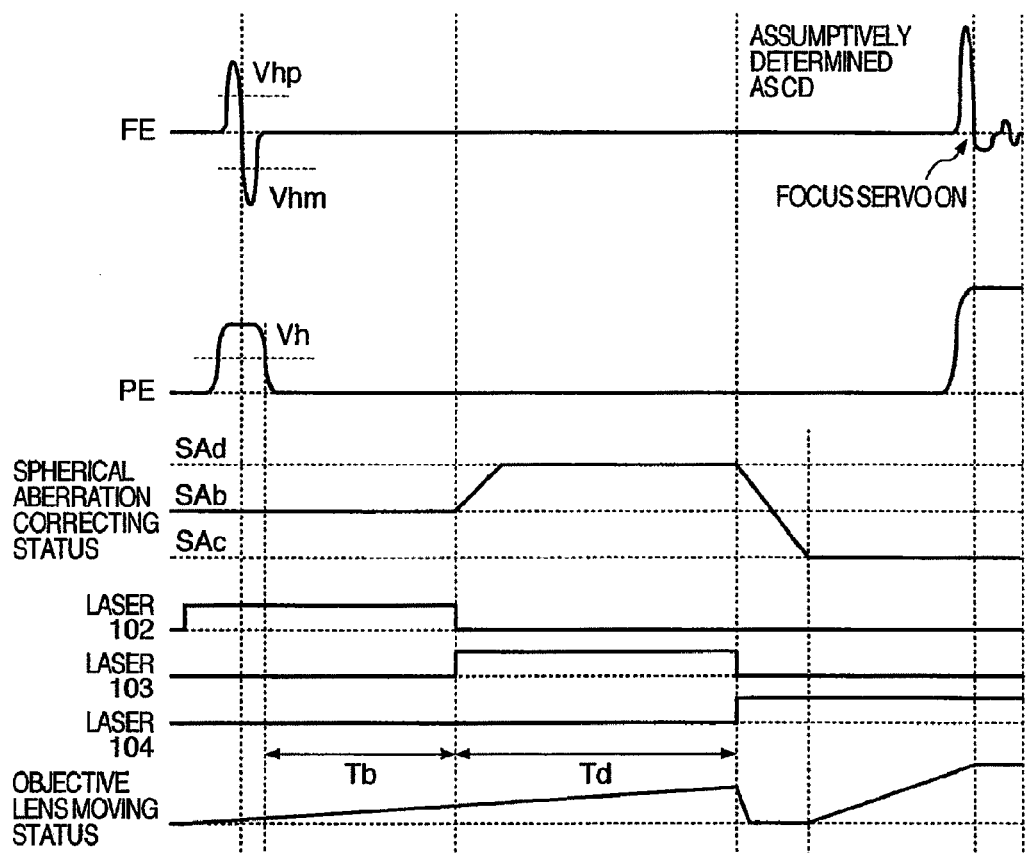
FIG. 11 is a time chart showing signal waveforms in the second embodiment of the invention.

Turning to FIG. 11, a discriminating method when the optical disk 100 is a CD will be described. An indication "objective lens moving status" in FIG. 11 signifies that as the objective lens 123 moves from low to high, it approaches the optical disk 100. If, after arrival at the surface, the optical disk 100 is determined as neither BD nor DVD, the disk is assumed to be a CD as in the case of FIG. 10. Thereafter, the semiconductor laser 104 for CD is activated, the objective lens is separated from the optical disk 100 to a remote movable end and the status of spherical aberration corrector is set to SAc suited for CD. Then, focus pull-in is started through up-sweep. If the focus servo system can be turned on after completion of the focus pull-in, the disk is determined as a CD.

In the method of the present embodiment, the medium discrimination time in the case of the optical disk 100 being a CD can be shortened as compared to embodiment 1.

Embodiment 3

Figure 12:
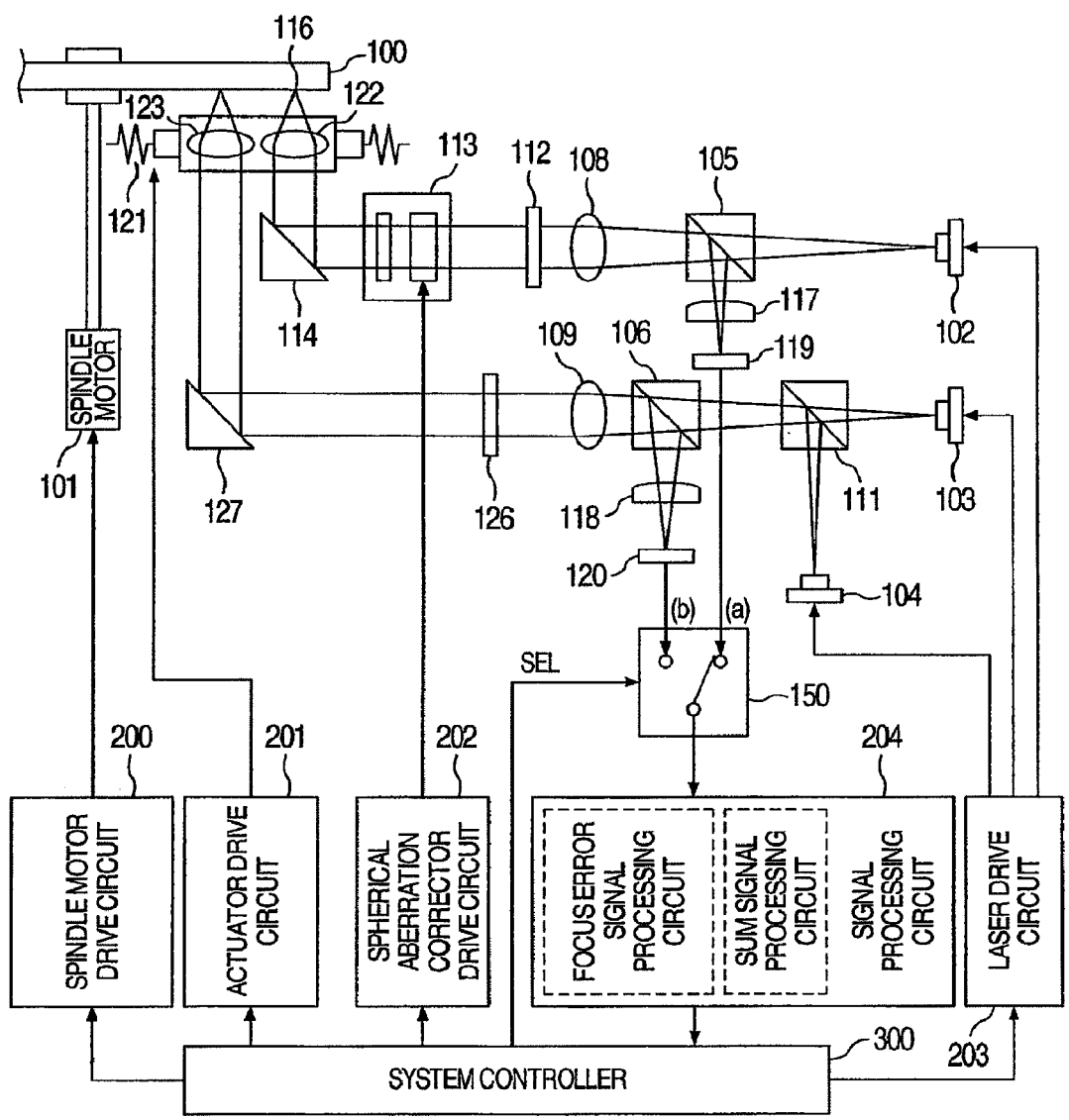
FIG. 12 is a block diagram showing on optical disk device according to a third embodiment of the present invention.

Next, a third embodiment of the present invention will be described with reference to FIG. 12. Components in FIG. 12 designated by the same reference numerals as those in FIGS. 1 and 9 are identical to the constituents explained in embodiments 1 and 2. Objective lenses 122 and 123 are moved by means of an actuator 121.

Like embodiment 1, a laser beam for BD is shaped into parallel flux of light by the collimate lens 108 and then passed through the quarter-wave plate 112 and spherical aberration corrector 113 and reflected by the mirror 114 so as to be led to the objective lens 122. As in the case of embodiment 1, laser beams for DVD and CD are each shaped into parallel flux of light by a collimate lens 109 and then, passed through a quarter-wave plate 126, reflected by a mirror 127 and led to the objective lens 123. Accordingly, in the present invention, only the laser beam for BD is passed through the spherical aberration corrector 113.

Figure 13:
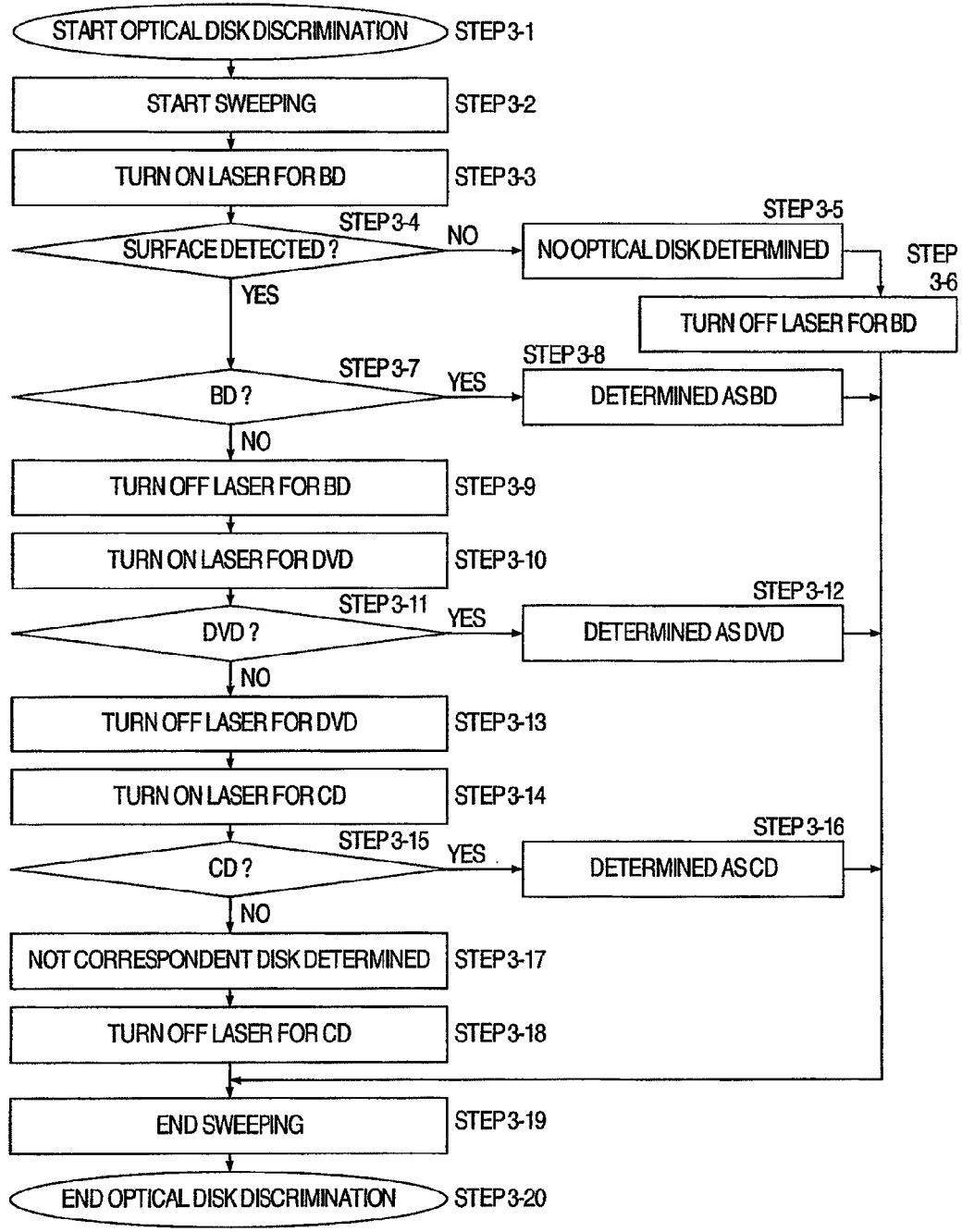
FIG. 13 is a flowchart in the third embodiment of the invention.

A flowchart of a discriminating method according to the present embodiment is depicted in FIG. 13. Assumptively, prior to start of discrimination, the status of spherical aberration corrector 113 on the optical path has already been set to SAb. In step 3-1, discrimination is started. In step 3-2, up-sweep of the objective lenses 122 and 123 is carried out after they have been separated from the optical disk 110 to remote movable ends.

In step 3-3, the semiconductor laser 102 is turned on to emit a laser beam for BD. In step 3-4, it is decided whether the surface can be detected. If No in the step 3-4, the program proceeds to step 3-5 in which no insertion of optical disk into the optical disk device is determined and in step 3-6, the laser for BD is turned off. If YES in the step 3-4, the program proceeds to step 3-7 in which the disk is decided as to whether to be a BD. If YES in the step 3-7, the program proceeds to step 3-8 in which the optical disk 100 is determined as a BD. If No in the step 3-7, the program proceeds to step 3-9 in which the semiconductor laser 102 for BD is turned off.

In step 3-10, the semiconductor laser 103 for DVD is turned on to emit a laser beam for DVD. In step 3-11, the disk is decided as to whether to be a DVD. If YES in the step 3-11, the program proceeds to step 3-12 in which the optical disk 100 is determined as a DVD. If No in the step 3-11, the program proceeds to step 3-13 in which the laser for DVD is turned off.

In step 3-14, the semiconductor laser 104 for CD is turned on. In step 3-15, the disk is decided as to whether to be a CD. If YES in the step 3-15, the program proceeds to step 3-16 in which the disk is determined as a CD. If No in the step 3-15, the program proceeds to step 3-17 in which the optical disk 100 is determined as an optical disk the optical disk device does not corresponds to or no insertion of optical disk into the optical disk device is determined and in step 3-18, the laser for CD is turned off.

After completion of the step 3-6, 3-8, 3-12, 3-16 or 3-18, sweeping is ended in step 3-19 and the process for making discrimination among optical disks is ended in step 3-20.

Figure 14:
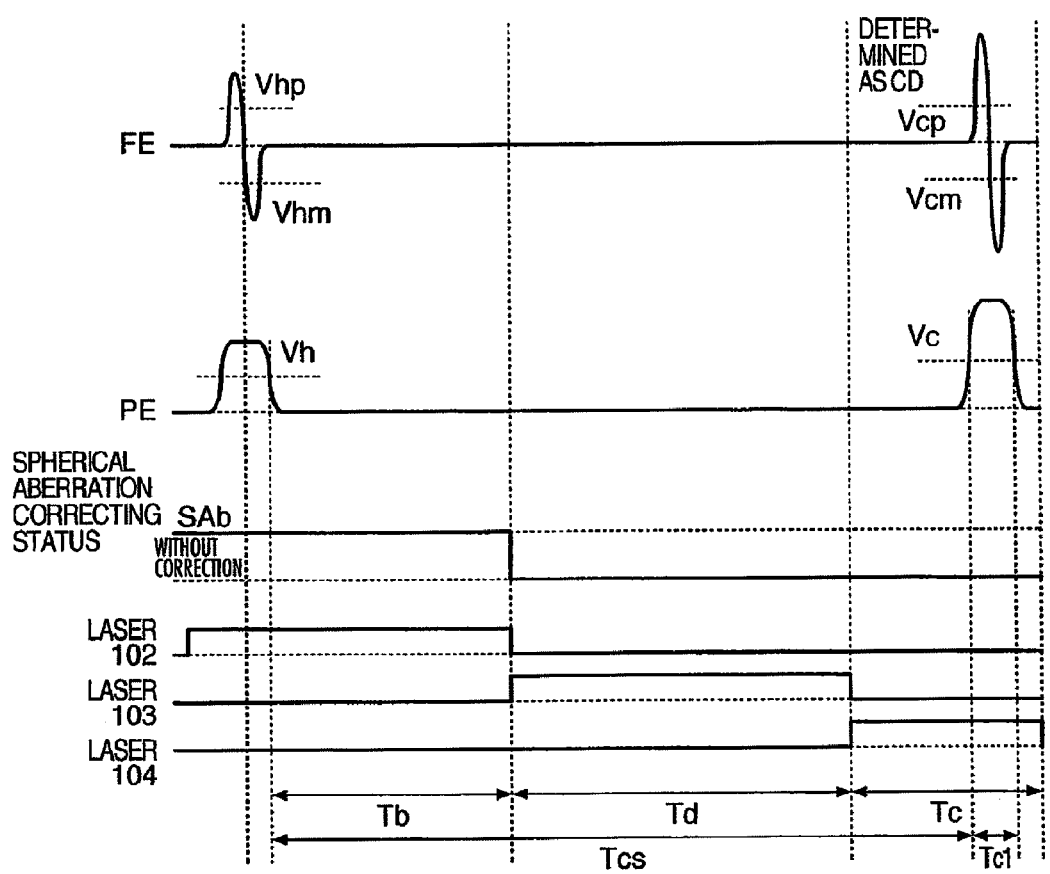
FIGS. 14 and 15 are time charts showing signal waveforms in the third embodiment of the invention.

Discrimination conditions for BD, DVD and CD are the same as those in the method explained in embodiment 1 with reference to FIGS. 4 to 8. A method for determination of CD in the present embodiment is depicted in FIG. 14. Firstly, the semiconductor laser 102 for BD is turned on and the surface is detected. If the discrimination condition for BD is not satisfied within time Tb, the semiconductor laser 102 for BD is turned off and instead, the semiconductor laser 103 for DVD is turned on. At that time, since a laser beam for DVD does not pass through the spherical aberration corrector, no spherical aberration correction is made for the beam. If, with the semiconductor laser 103 for DVD turned on, the discrimination condition for DVD is not satisfied within time Td, the semiconductor laser 103 for DVD is turned off and instead the semiconductor laser 104 for CD is turned on. Since a laser beam for CD does not pass through the spherical aberration corrector, either, no spherical aberration correction is made for the beam. If, with the semiconductor laser 104 for CD turned on, the discrimination condition for CD is satisfied within time Tc, the disk is determined as a CD but if not satisfied, the optical disk 100 is determined as an optical disk the optical disk device does not corresponds to or no insertion of optical disk is determined.

Figure 15:
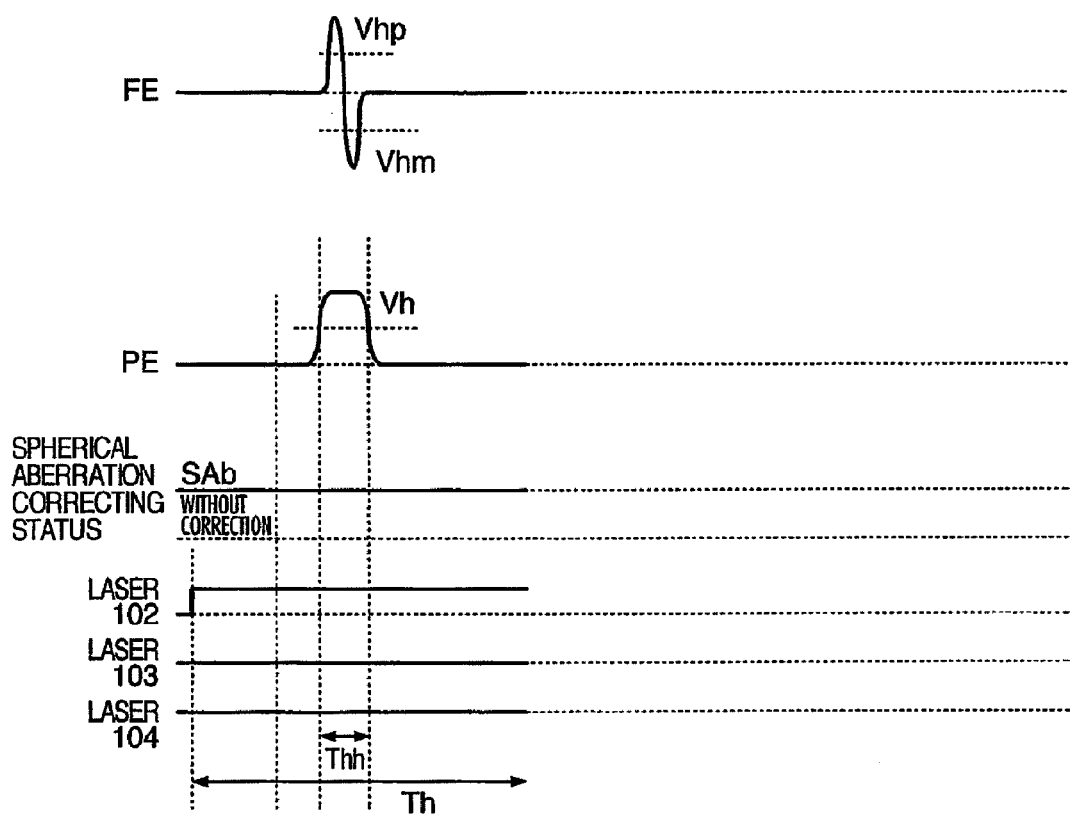

Referring to FIG. 15, there is illustrated a time chart for explaining a method for deciding the surface. In case the voltage level of PE signal crosses Vh for a time of about Thh within time Th following activation of the laser for BD, the surface is so determined as to be passed by. If this condition is not satisfied, no insertion of optical disk into the optical disk device is determined. Alternatively, the time Th may not be set but the objective lens 122 may be swept throughout the overall movable range to determine whether the aforementioned decision condition is satisfied.

As in the case of embodiment 1, it is also necessary in the method of the present embodiment that the distance between the optical disk 100 and each of the objective lenses 122 and 123 at the time that the focus of the laser beam is irradiated on the information recording layer of optical disk 100 differ with the kind of the optical disk.

Embodiment 4

Figure 16:
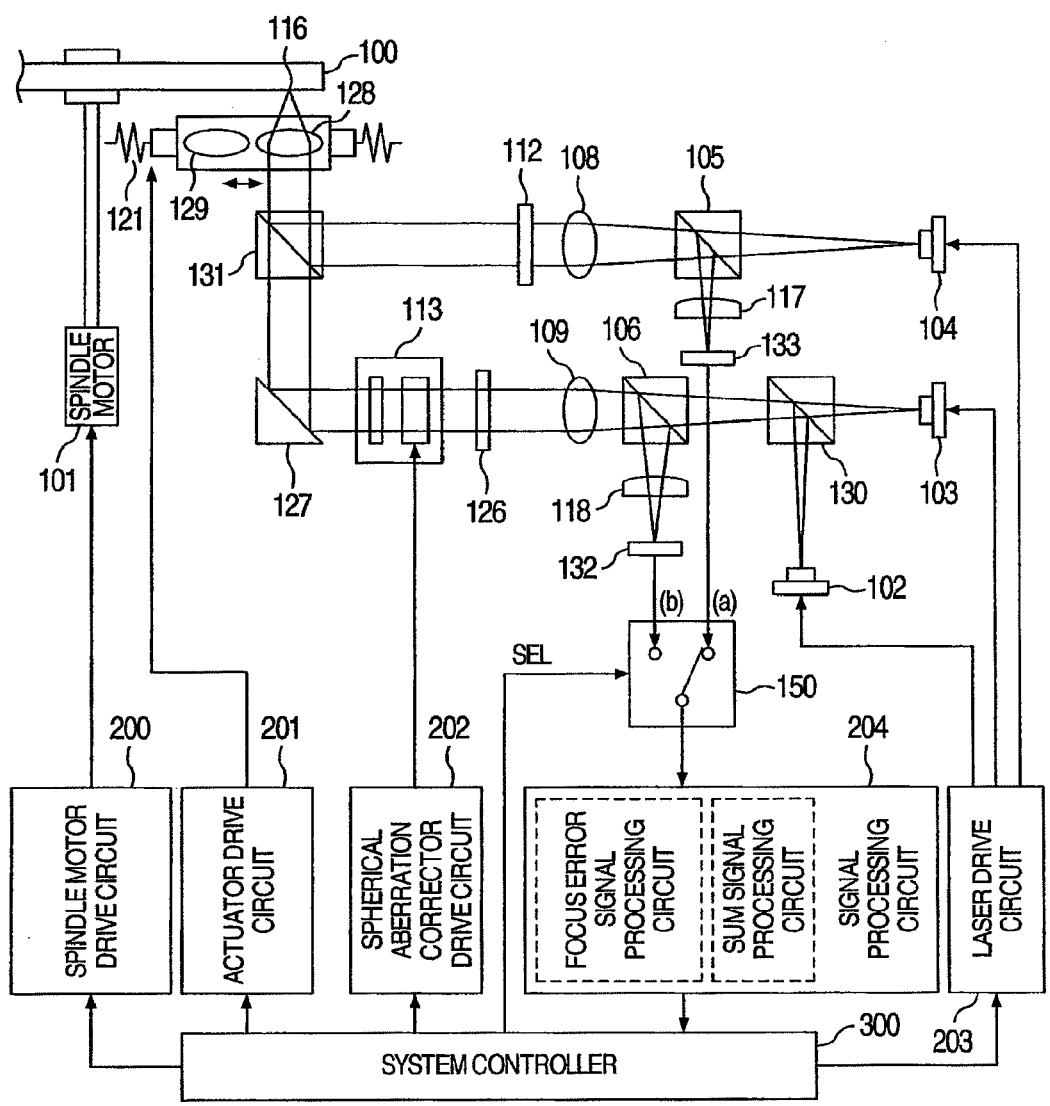
FIG. 16 is a block diagram showing an optical disk device according to a fourth embodiment of the present invention.

Turning now to FIG. 16, a fourth embodiment of the invention will be described. Components in FIG. 16 designated by the same reference numerals as those in FIGS. 1, 9 and 12 are identical to the constituents explained in embodiment 1 with reference to FIGS. 1 to 3.

An optical disk device in FIG. 16 comprises an objective lens 128 corresponding to two wavelengths for BD and DVD and an objective lens 129 correspondent to CD. The objective lenses 128 and 129 are switched such that one of them is set on an optical path and when the semiconductor laser 102 for BD and semiconductor laser 103 for DVD are activated, the objective lens 128 for BD and DVD is on the optical path and when the semiconductor laser 104 for CD is activated, the objective lens 129 for CD is on the optical path. Like embodiment 1, the objective lenses 128 and 129 are moved by means of the actuator 121.

A dichroic mirror 130 is an element for reflecting a wavelength of laser beam for BD but transmitting a wavelength of laser beam for DVD and a dichroic mirror 131 is an element for transmitting wavelengths of laser beams for BD and DVD but reflecting a wavelength of laser beam for CD.

A photodetector 132 outputs signals corresponding to reflected rays of laser beams for BD and DVD from the optical disk and the output signals are connected to the input terminal (b) of change-over switch 150.

A photodetector 133 outputs a signal corresponding to a reflected ray of a laser beam for CD from the disk and the output signal is connected to the input terminal (a) of change-over switch 150.

The change-over switch 150 responds to an SEL signal to perform switching between the outputs of the photodetector 132 for detection of reflected rays for BD and DVD and the output of the photodetector 133 for detection of a reflected ray for CD and supply a selected output to the signal processing circuit 204. The SEL signal is a transfer signal for connecting the input terminal (b) to the signal processing circuit 204 when the semiconductor laser 102 for BD or the semiconductor laser 103 for DVD is turned on and for connecting the input terminal (a) to the signal processing circuit 204 when the semiconductor laser 104 for CD is turned on.

A flowchart of a discriminating method of the 5 present embodiment is depicted in FIG. 17. Assumptively, before starting discrimination, the objective lens 128 for BD and DVD is set on the optical path. In step 4-1, discrimination is started. In step 4-2, the objective lens 128 is separated from the optical disk 100 to a remote movable end and thereafter, up-sweep is conducted.

In step 4-3, the semiconductor laser 102 is turned on to emit a laser beam for BD. In step 4-4, the spherical aberration corrector 113 is moved to bring its status into SAb. In step 4-5, it is decided whether the disk is a BD. If YES in the step 4-5, the program proceeds to step 4-6 in which the optical disk 100 is determined as a BD. If No in the step 4-5, the program proceeds to step 4-7 in which the semiconductor laser 102 for BD is turned off.

In step 4-8, the semiconductor laser 103 for DVD is turned on to emit a laser beam for DVD. In step 4-9, the spherical aberration corrector 113 is moved to bring its status into SAd. In step 4-10, it is decided whether the disk is a DVD. If YES in the step 4-10, the program proceeds to step 4-11 in which the optical disk 100 is determined as a DVD. If No in the step 4-10, the program proceeds to step 4-12 in which the laser for DVD is turned off.

In step 4-13, the objective lens on the optical path is switched from the objective lens 128 for BD and DVD to the objective lens 129 for CD. In step 4-14, the semiconductor laser 104 for CD is turned on. In step 4-15, it is decided whether the disk is a CD. If YES in the step 4-15, the program proceeds to step 4-16 in which the disk is determined as a CD. If No in the step 4-15, the program proceeds to step 4-17 in which the optical disk 100 is determined as an optical disk the optical disk device does not corresponds to or no insertion of optical disk into the optical disk device is determined and in step 4-18, the laser for CD is turned off.

Following the step 4-6, 4-11, 4-16 or 4-18, sweeping is ended in step 4-19 and the process for making discrimination among optical disks is ended in step 4-20.

Discrimination conditions for BD, DVD and CD are the same as those in the method explained in embodiment 1 with reference to FIGS. 4 to 8. But, while in FIG. 8 the status of the spherical aberration corrector for CD is set to SAc, this correction is not made in the present embodiment.

Like embodiment 1, the distance between the optical disk 100 and each of the objective lenses 128 and 129 at the time that the focus of the laser beam is irradiated on the information recording layer of optical disk 100 must differ with the kind of optical disk also in the present embodiment.

Differing from embodiment 3, the present embodiment allows the spherical aberration correction to be made even for DVD. The DVD is a double-layer disk which is susceptible to spherical aberration and for this reason, with the spherical aberration corrected, more accurate signals can be detected. Further, if the spherical aberration correction is desired to be made also for DVD in embodiment 3, the optical pickup may be constructed such that the laser beam for DVD can pass through the spherical aberration corrector.

In embodiments 1 to 4, the kind of optical disk 100 can be determined through one sweeping operation. In addition, the kind of optical disks the optical disk device can deal with amounts up to three kinds of BD, DVD and CD but even in an optical disk device correspondent to another kind of disk, for example, HD-DVD, discrimination can be accomplished through a similar method.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An optical disk device capable of loading a plurality of different kind of optical disks for use with different laser wavelengths, comprising:
    a first laser source configured to emit laser light of a first wavelength, said first laser source suitable for operation with optical disks of a first kind;
    a second laser source configured to emit laser light of a second wavelength longer than said first wavelength, said second laser source suitable for operation with optical disks of second kind;
    a first objective lens arranged to receive laser light of said first wavelength from said first laser source;
    a second objective lens arranged to receive laser light of said second wavelength from said second laser source, the numerical aperture of said second objective lens being smaller than said first objective lens;
    an actuator to adjust said objective lens;
    a spherical aberration corrector to correct spherical aberration of an incident laser beam; and
    module for determining, for an optical disk loaded in the optical disk device, whether said loaded optical disk is an optical disk of the first kind or an optical disk of the second kind, wherein:
    said spherical aberration corrector is set to a state which is appropriate for an optical disk of the first kind, and said first objective lens is adjusted by said actuator to determine if said loaded optical disk is an optical disk of the first kind; and
    if said loaded optical is not an optical disk of first kind, then said objective lens is adjusted by said actuator to determine if said loaded optical disk is an optical disk of the second kind.

2. A method for an optical device capable of loading a plurality of different kinds of optical disks for use with different laser wavelengths, the method comprising:
    receiving an optical disk;
    setting a spherical aberration corrector to a state which is appropriate for an optical disk of a first kind;
    producing a laser beam of a first wavelength that is suitable for use with an optical disk of the first kind, the laser beam of the first wavelength passing through a first objective lens being incident upon the received optical disk;
    adjusting a focus of the first objective lens to determine if the received optical disk is of the first kind;
    if the received optical disk is not of the first kind, the producing a laser beam of a second wavelength that is suitable for use with an optical disk of the second kind, the laser beam of a second wavelength passing through a second objective lens being incident upon the received optical disk, the numerical aperture of said second objective lens being smaller than said first objective lens; and
    adjusting a focus of the objective lens to determine if the received optical disk is of second kind.

* * * * *